(12) United States Patent
Ko et al.

(10) Patent No.: US 6,813,230 B1
(45) Date of Patent: Nov. 2, 2004

(54) PHYSICAL IDENTIFICATION DATA ADDRESSING METHOD USING WOBBLE SIGNAL, WOBBLE ADDRESS ENCODING CIRCUIT, METHOD AND CIRCUIT FOR DETECTING WOBBLE ADDRESS, AND RECORDING MEDIUM THEREFOR

(75) Inventors: Jung-wan Ko, Yongin (KR); In-sik Park, Suwon (KR); Kyung-geun Lee, Seongnam (KR); Du-seop Yoon, Suwon (KR); Seong-sin Joo, Suwon (KR); Jae-seong Shim, Seoul (KR); Byoung-ho Choi, Suwon (KR); Byung-in Ma, Suwon (KR); Tatsuhiro Otsuka, Suwon (KR); Yong-jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 09/704,656

(22) Filed: Nov. 3, 2000

(30) Foreign Application Priority Data

Nov. 3, 1999 (KR) .......................................... 1999-48453
Mar. 25, 2000 (KR) .......................................... 2000-15329

(51) Int. Cl.$^7$ ................................................. G11B 7/00
(52) U.S. Cl. ................. 369/47.1; 369/275.3; 369/44.13
(58) Field of Search ............................. 369/47.1, 47.19, 369/44.13, 275.3

(56) References Cited

U.S. PATENT DOCUMENTS 6,298,021 B2 * 10/2001 Aoki .......................... 369/47.1

6,549,495 B1 * 4/2003 Sruit et al. ................ 369/47.19

FOREIGN PATENT DOCUMENTS

| CN | 1195171 H | 10/1998 |
|---|---|---|
| JP | 9279129 | 10/1979 |
| JP | 10-021555 | 1/1998 |
| JP | 10143933 | 5/1998 |
| JP | 10-312541 | 11/1998 |
| JP | 11007660 | 1/1999 |
| JP | 6208614 | 3/2001 |
| JP | 1098302 | 5/2001 |
| JP | 2001143273 | 5/2001 |

* cited by examiner

Primary Examiner—Nabil Hindi
(74) Attorney, Agent, or Firm—Staas & Halsey LLP

(57) ABSTRACT

A physical identification data (PID) addressing method using a wobble signal, a wobble address encoding circuit, a method and circuit for detecting the wobble address and a recording medium therefor. Groove address information indicating physical identification information is phase modulated using a wobble clock signal and recorded in one of the two walls of a groove track, and land address information is phase modulated using a wobble clock signal obtained by shifting the phase of the former wobble clock signal and recorded in the other wall. That is, address information is phase modulated and recorded in each track using the wobbles having a phase difference of 90° between adjacent tracks so that a sum of wobble signals from the adjacent tracks can be a quadrature phase shift keying (QPSK) signal. Therefore, more data can be recorded in the recording medium, and since an interval in which a wobble signal disappears is not caused, recovery of a wobble clock signal can be advantageously performed.

75 Claims, 11 Drawing Sheets

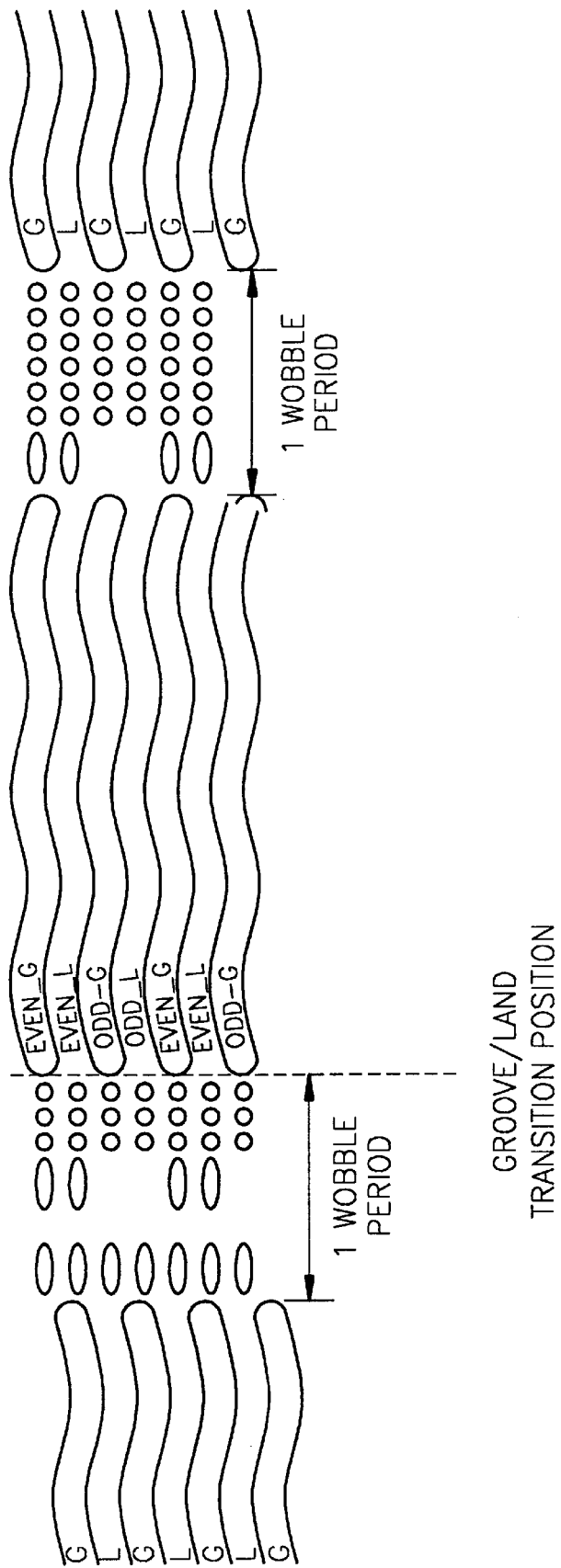

FIG. 9E

| SM | PID#n | PID#n | PID#n | SM | PID#n+1 | PID#n+1 | PID#n+1 |
|----|-------|-------|-------|----|---------|---------|---------|
| SM |       |       |       | SM |         |         |         |
| SM | PID#n+2m | PID#n+2m | PID#n+2m | SM | PID#n+2m+1 | PID#n+2m+1 | PID#n+2m+1 |

FIG. 12H
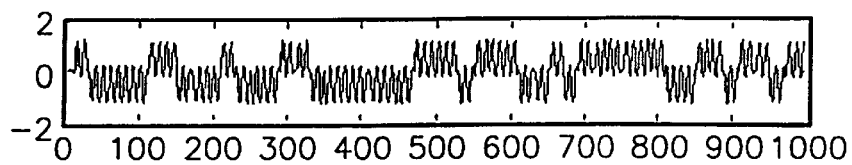
FIG. 12I
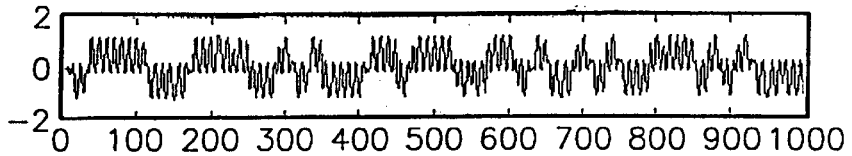
FIG. 12J    GROOVE1 ADDRESS DETECTED FROM GROOVE TACK
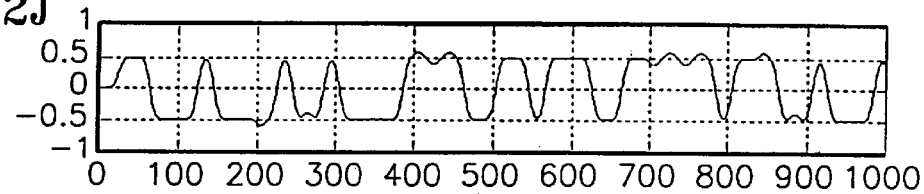
FIG. 12K    LAND1 ADDRESS FROM GROOVE TRACK
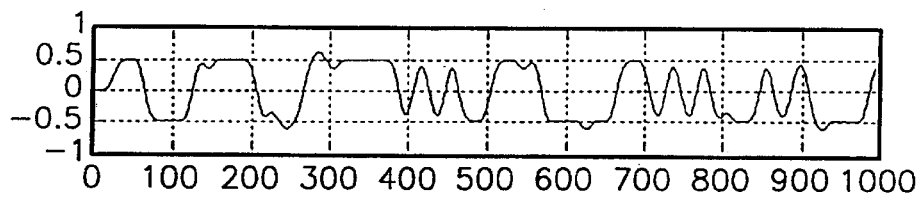
FIG. 12L    LAND1 ADDRESS DETECTED FROM LAND TRACK
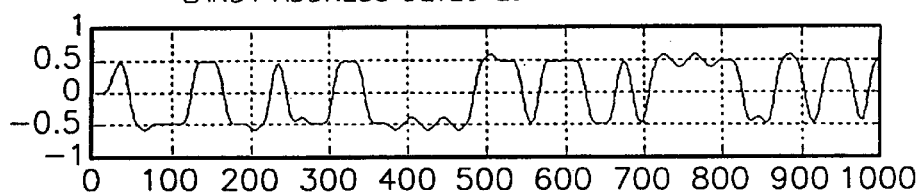
FIG. 12M    GROOVE2 ADDRESS FROM LAND TRACK
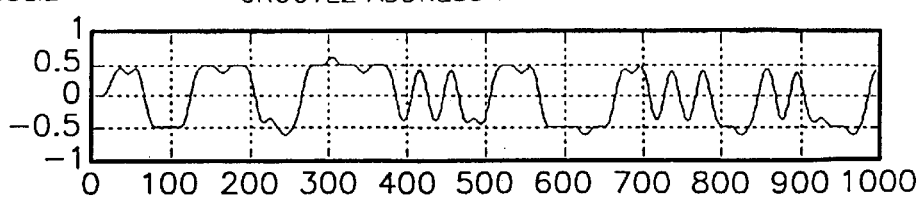

PHYSICAL IDENTIFICATION DATA ADDRESSING METHOD USING WOBBLE SIGNAL, WOBBLE ADDRESS ENCODING CIRCUIT, METHOD AND CIRCUIT FOR DETECTING WOBBLE ADDRESS, AND RECORDING MEDIUM THEREFOR

CROSS-REFERENCE TO RELATED APPLICATIONS

This application claims the benefit of Korean Application Nos. 99-48453, filed Nov. 3, 1999 and 00-15329, filed Mar. 25, 2000, in the Korean Patent Office, the disclosures of which are incorporated herein by reference.

BACKGROUND OF THE INVENTION

1. Field of the Invention

The present invention relates to optical recording/playback, and more particularly, to a physical identification data (PID) addressing method using a wobble signal, a wobble address encoding circuit, a method and circuit for detecting the wobble address, and a recording medium in a high density optical recording and reproducing system.

2. Description of the Related Art

Information used for physical location recognition to determine a location to which data is written on a disc in an optical recording system is referred to as physical identification data (PID). Generally, PID is address information of a physical sector in a recording and reproducing medium on which data is recorded in units of sectors. This is essential information for recording data at a certain location on a disc and finding the location at a later time.

In other words, PID indicates address information for finding a specified sector to record/reproduce data to/from a certain location, particularly in a recording/reproducing disc, and indicates address information of a sector which is pre-mastered during manufacture of a disc regardless of the existence or non-existence of user data. Accordingly, PID is supposed to be resistant to errors and have a structure allowing fast detection in order to exactly and quickly find the location of a sector which data will be recorded on or reproduced from.

Various methods of recording PID on a disc can be largely classified into two methods. One method is recording physical location information on a disc by forming embossed pits as used in a read-only optical disc to allow a certain location on the disc to be detected based on the embossed pits. The other method uses a wobble signal which can be obtained by giving some changes to recording tracks on a disc at a predetermined time interval.

An area, which is provided for performing PID addressing using the former method, that is, using embossed pre-pits, is referred to as a header field, as shown in FIG. 1. According to a digital versatile disc (DVD) specification for rewritable discs (2.6 or 4.7 gigabytes (GB) DVD-random access memory (RAM)) version 1.0, physical location information is recorded at the location of the so called header field, which comprises pre-pits, during manufacture of a substrate. The header field includes a variable frequency oscillator (VFO) area for a phase locked loop (PLL), a PID area to which a sector number is assigned, an ID error detection (IED) area for storing ID error detection information and a postamble (PA) area for setting up an initial state for modulation of data recorded following the header field. In a PID addressing method using pre-pits, such a header field comprising embossed pre-pits is appropriately disposed at the start of a sector to allow a pickup to easily find and move to a desired location using this information. A sector number, sector type and a land track/groove track can be recognized from the addressed information, and even servo control is possible.

In such a PID addressing method using conventional embossed pre-pits, data cannot be recorded in areas in which pits are formed. Therefore, a problem of a decrease in recording density in proportion to the areas where the pits are formed occurs.

To store a large amount of data with a high density, it is necessary to increase a recordable area (a user data area) by decreasing a track pitch and minimizing a non-recordable area (overhead). For this purpose, it is effective to use a wobble signal.

When forming a substrate for a recording disc, grooves are formed along recording tracks on the substrate to allow a certain track to be exactly tracked by a pickup even if data is not recorded on the track. The portions other than the grooves are referred to as lands. Recording methods can be classified into a method of recording data on either a land or a groove and a method of recording data on both the land and the groove. It is more advantageous to use the land and groove recording method in which data is recorded on both the land and the groove as the density of data increases.

In addition, a method of generating a signal of a specified frequency by varying both walls of a groove to use it as an auxiliary clock signal during recording is used. This signal is referred to as a wobble signal. A wobble signal having a single frequency is also recorded in the substrate of a DVD-RAM disc.

In a PID addressing method using a wobble signal, overhead information such as a PID signal can be recorded by varying a wobble signal having a single frequency, for example, periodically varying the phase or frequency of the wobble signal, during recording. Here, the PID signal embedded in the wobble signal is generally referred to as a wobble address.

Since the conventional PID addressing method using a wobble signal uses the variation of both walls of a groove track in which a wobble will be recorded, as shown in FIG. 2, the method can be used only in discs employing a land recording method in which information is not recorded in groove tracks. In other words, when using changes in both walls of each groove track, address information of two groove tracks at both sides of a land track can be mixed with each other, so that exact information cannot be obtained from the land track. Accordingly, both the addresses of a land track and a groove track cannot be indicated just by using a wobble address formed in the groove track. Therefore, it is difficult to use the conventional method in discs employing a land and groove recording method in which information is recorded in both land and groove tracks.

Although a wobble address is recorded in the side wall of a groove track at the boundary between a land track and the groove track, information of wobbles formed in both walls of the land and groove tracks is simultaneously read when the land and groove recording method of recording information in land and groove tracks is used. Accordingly, a PID signal cannot be exactly recorded or detected when using the wobble addressing method shown in FIG. 2.

To solve this problem, a method of recording a wobble address in only one wall of each groove track is proposed, as shown in FIG. 3. In this wobble addressing method, however, since a wobble signal is generated from only one sidewall of a groove track, the strength of the signal decreases. In addition, since the same signal is read from the groove track and an adjacent land track, additional information for discriminating a land track from a groove track is required.

SUMMARY OF THE INVENTION

To solve the above problems, a first object of the present invention is to provide a new physical identification data (PID) addressing method using a wobble to solve an overhead problem of an addressing method using embossed pre-pits, and to solve a problem of a conventional wobble addressing method being incompatible with a land and groove recording method.

A second object of the present invention is to provide a PID addressing method in which wobble signals are differently configured in either of two walls of each groove track (or each land track) so that an in-phase component signal of a quadrature phase shift keying (QPSK) signal is recorded in one of the two walls, and a quadrature component signal of the QPSK signal is recorded in the other wall.

A third object of the present invention is to provide a method of detecting address information from a recording medium in which the wobble signals of both walls of each groove track (or each land track) are differently configured so that an in-phase component signal of a QPSK signal is recorded in one of both walls, and a quadrature component signal of the QPSK signal is recorded in the other wall.

A fourth object of the present invention is to provide a wobble address encoding circuit for a high density optical disc recording and reproducing system.

A fifth object of the present invention is to provide a wobble address detecting circuit for a high density optical disc recording and reproducing system.

A sixth object of the present invention is to provide a recording medium in which the wobble signals of both walls of each groove track (or each land track) are differently configured so that an in-phase component signal of a QPSK signal is recorded in one of both walls, and a quadrature component signal of the QPSK signal is recorded in the other wall.

Additional objects and advantages of the invention will be set forth in part in the description which follows and, in part, will be obvious from the description, or may be learned by practice of the invention.

To achieve the above objects, the present invention provides a method of addressing physical identification information using a wobble on an optical recording/reproducing medium. The method includes phase modulating first address information indicating the physical identification information using a first wobble signal and recording the phase modulated first address information in one of the two walls of either of a groove track and a land track, and phase modulating second address information using a second wobble signal having a predetermined phase relation with the first wobble signal and recording the phase modulated second address information in the other wall.

The present invention also provides a method of detecting a wobble address from an optical recording medium, in which first address information indicating the physical identification information is phase modulated using a first wobble signal and recorded in one of the two walls of either of a groove track and a land track, and second address information is phase modulated using a second wobble signal having a predetermined phase relation with the first wobble signal and recorded in the other wall, in an optical recording and reproducing system having an optical detecting device. The method includes providing first and second output signals, each having an original signal component and a harmonic component, by multiplying a difference signal between radially half-divided detection signals of the optical detecting device by the first and second wobble signals having the predetermined phase relation, respectively; and removing the harmonic component from the first and second output signals and recovering the first address information and the second address information from the corresponding original signal component having a phase component.

The present invention also provides a circuit for encoding an address using a wobble in an optical recording and reproducing system. The circuit includes a provider which generates a first wobble signal and a second wobble signal which has a predetermined phase relation with the generated first wobble signal; and a phase modulator which phase modulates first address information indicating physical identification information using the first wobble signal with respect to one of two walls of either of a groove track and a land track, and phase modulates second address information using the second wobble signal with respect to the other wall.

The present invention also provides a circuit for detecting a wobble address from an optical recording and reproducing medium, in which first address information indicating the physical identification information is phase modulated using a first wobble signal and recorded in one of two walls of either of a groove track and a land track, and second address information is phase modulated using a second wobble signal having a predetermined phase relation with the first wobble signal and recorded in the other wall, in an optical recording and reproducing system having an optical detecting device. The circuit includes a wobble clock recoverer which detects a first wobble clock signal using a difference signal (a push-pull signal) between radially half-divided detection signals of the optical detecting device and provides a second wobble clock signal having the predetermined phase relation with the detected first wobble clock signal; and a phase demodulator which recovers groove and land address information, which is first and second address information, from the push-pull signal using the first and second wobble clock signals.

The present invention also provides a recording and reproducing medium employing a groove/land recording method, wherein first address information indicating physical identification information is phase modulated using a first wobble signal and recorded in one of two walls of either of a groove track and a land track, and second address information is phase modulated using a second wobble signal having a predetermined phase relation with the first wobble signal and recorded in the other wall.

BRIEF DESCRIPTION OF THE DRAWINGS

The above objects and advantages of the present invention will become more apparent by describing in detail preferred embodiments thereof with reference to the attached drawings in which:

FIG. 8 is a diagram showing a sector mark located at the beginning of a sector and a first sector mark of a track as an example of the track structure shown in FIG. 6;

FIGS. 9A through 9E are diagrams showing examples of the contents of the sector mark shown in FIG. 8;

FIGS. 12A through 12M are waveform diagrams showing the waveforms of members of the detecting circuit shown in FIG. 11.

DETAILED DESCRIPTION OF THE INVENTION

Hereinafter, a physical identification data (PID) addressing method using a wobble signal, a wobble address encoding circuit, a method and circuit for detecting the wobble address, and a recording medium therefor will be described with reference to the accompanying drawings, in which preferred embodiments of the invention are shown.

When reading a wobble address, which is formed using both sidewalls of a groove track, from a land track, a signal is read from the wall of each of the groove tracks at both sides of the land track, so that the signals from the adjacent walls of adjacent grooves are combined. To process this combined signal and not allowing interference of a wobble signal between adjacent tracks, the present invention provides a PID structure using a wobble, as shown in FIG. 4.

Figure 1:
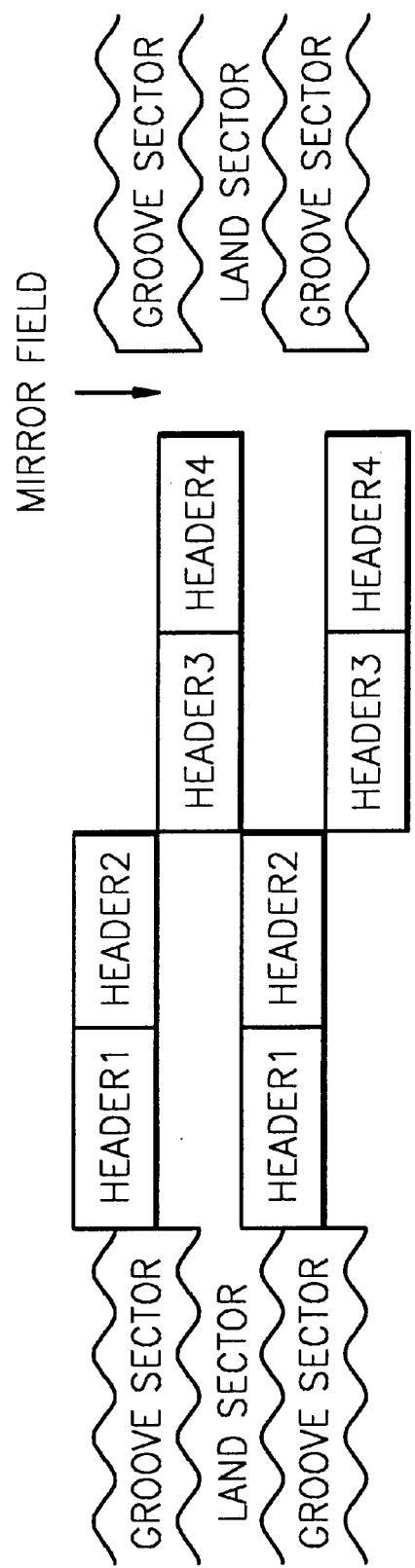
FIG. 1 is a diagram showing a physical identification data (PID) addressing structure using conventional embossed pre-pits.
Figure 2:
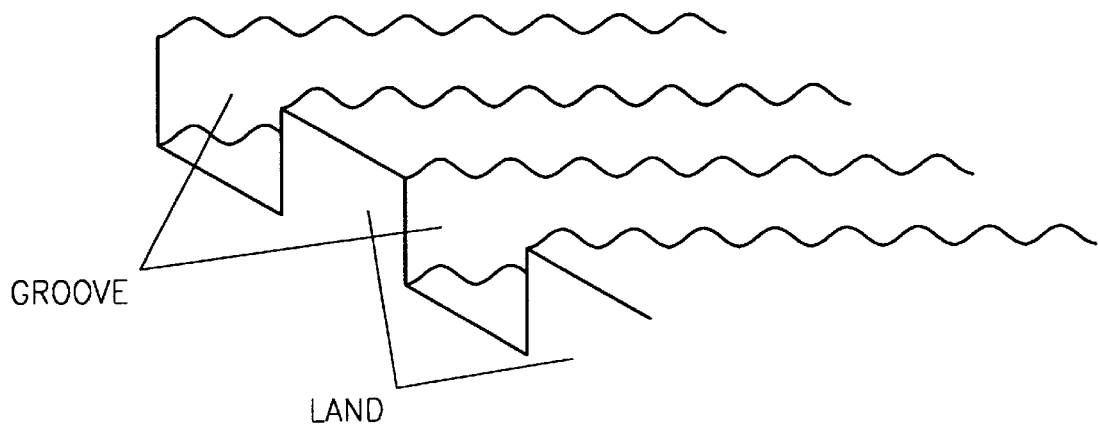
FIG. 2 shows a conventional example in which wobbles are recorded in groove and land tracks.
Figure 3:
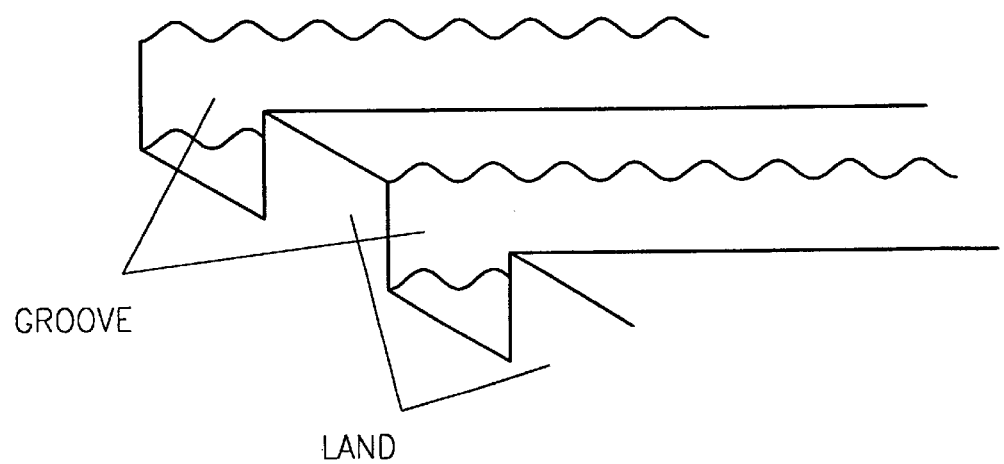
FIG. 3 is a conventional example in which a wobble address is recorded in one wall of a groove track.
Figure 4:
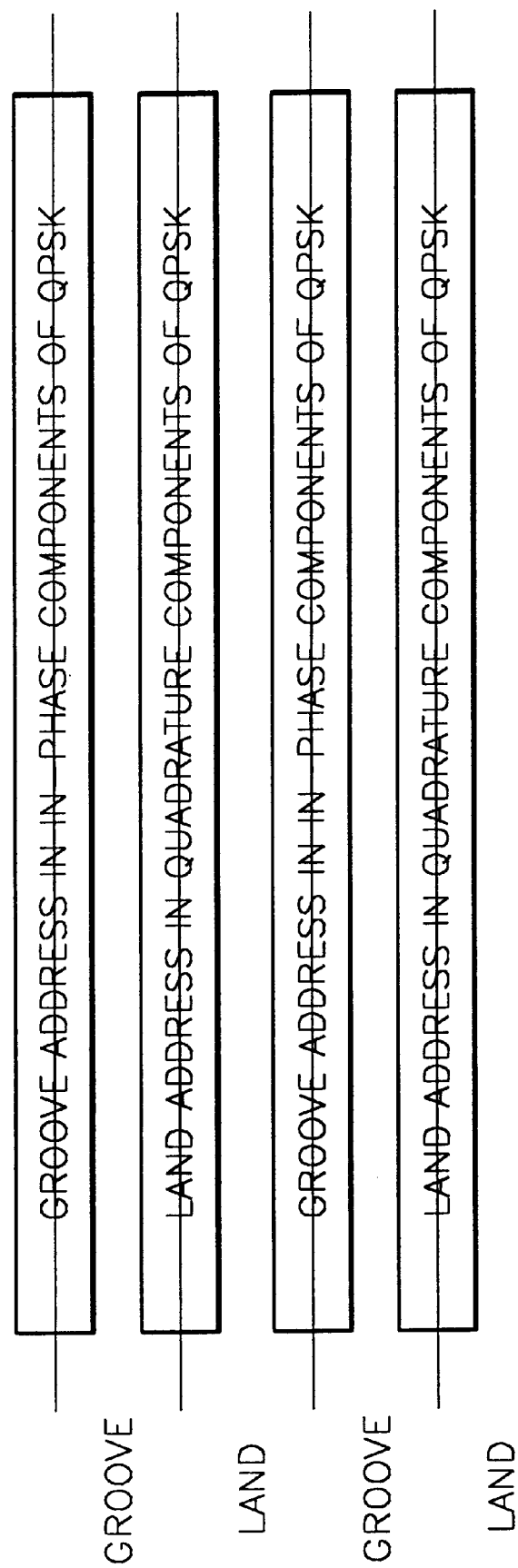
FIG. 4 is a diagram showing a PID addressing structure in which a wobble address is recorded according to the present invention.

FIG. 4 is a diagram showing a PID addressing structure using wobbles allowing addresses to be independently recorded on land and groove tracks according to the present invention. This structure is applied to a disc in which physical locations on land and groove tracks are to be individually accessed, for example, a disc employing a land and groove recording method, in which tracks are formed to have a constant angular velocity such as a zoned constant linear velocity (ZCLV) or a constant angular velocity (CAV) between adjacent tracks. Here, since the walls of a groove have different shapes, it is preferable to use two beams during mastering.

When manufacturing a substrate, grooves are formed on the substrate using a laser beam. At this time, a wobble signal is formed by displacing the laser beam by the size of the wobble signal in a direction perpendicular to a tracking direction. Wobbles having different shapes for either wall of a groove, as embodied in the present invention, cannot be formed with a single beam. Accordingly, it is preferable to use two beams to form different wobbles in either wall of a groove. Alternatively, a beam having a diameter much smaller than the width of a track may be displaced by a desired track width in a direction perpendicular to a tracking direction. However, it is difficult to obtain a beam having a diameter sufficiently smaller than the width of a track when the width of the track is narrower for high density recording.

The wobble signals of both walls of a groove track are differently configured to each other so that an in-phase component signal of a quadrature phase shift keying (QPSK) signal is recorded in one of the two walls, and a quadrature component signal of the QPSK signal is recorded in the other wall. A groove address is always recorded in the in-phase component signal, and a land address is always recorded in the quadrature component signal. The structure shown in FIG. 4 has a disadvantage of requiring two beams for mastering but has an advantage of simplifying a circuit for detecting a signal. Alternatively, a land address may always be recorded in the in-phase component signal, and a groove address may always be recorded in the quadrature component signal.

When an address data bit is "0", a wobble signal having a phase of 0 degrees is recorded, and when an address data bit is "1", a wobble signal having a phase of 180 degrees is recorded. In one embodiment, for the phase of a wobble clock signal, a carrier having a phase of 0 degrees may be used for one wall of a groove track, and a carrier having a phase shifted by 90 degrees may be used for the other wall of the groove track.

A groove address having an in-phase component and a land address having a quadrature component, which are recorded in either wall, respectively, of a groove track, are bi-phase shift keying (BPSK)-modulated signals. A signal read from each track is a QPSK-modulated signal in which modulated groove address information in an in-phase component is combined with modulated land address information in a quadrature component.

In other words, an in-phase component signal $W_1$ of QPSK recorded in one of the two walls of a groove track can be expressed as follows.

$$w_1 = a(nT) \cdot \sin(\omega t) \tag{1}$$

where T is the sample period of address data, and a(nT) has an address value "1" or "−1" in a period T depending on each bit value of groove address data. The variation period T of the address data exceeds the period 1/f of the wobble signal. Here, f is the frequency of the wobble signal, and $\omega = 2\pi f$.

A quadrature component signal $W_Q$ of QPSK recorded in the other wall of the groove track can be expressed as follows.

$$W_Q = b(nT) \cos(\omega t) \tag{2}$$

where b(nT) has an address value "1" or "−1" in a period T depending on each bit value of land address data.

As described above, when wobble signals are differently configured in either wall of each groove track, the structure of the wobble signal of each track can be expressed as follows.

$$W_{track} = a(nT) \cdot \sin(\omega t) + b(nT) \cdot \cos(\omega t) \tag{3}$$

Figure 6:
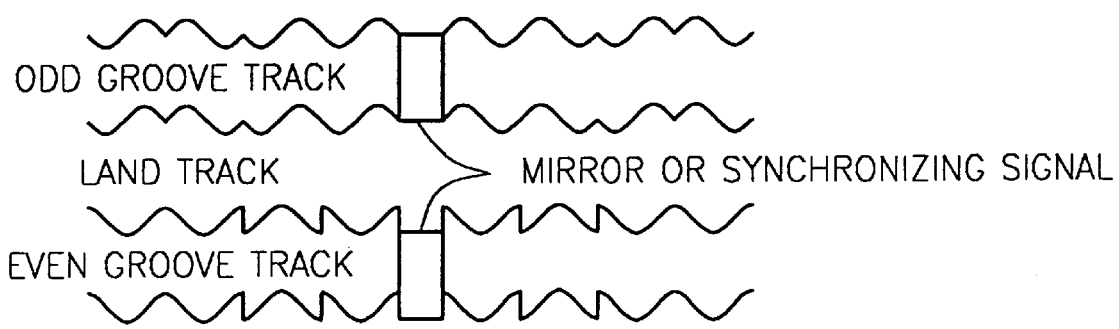
FIG. 6 is a diagram showing a track structure in which a mirror or a wobble synchronizing signal for synchronizing the phases of wobble signals at an initial stage is recorded according to the present invention.

Meanwhile, it is very important to detect the initial phase of a wobble signal. Accordingly, it is preferable to record a mirror zone or a synchronizing signal which can synchronize the phases of wobble signals in each sector or in each specified unit, as shown in FIG. 6. This will be more fully described in FIGS. 8 and 9. Additionally, in the case of a complementary allocated pit address (CAPA) method used in DVD-RAMs, a CAPA signal and a variable frequency oscillator (VFO) embedded in the CAPA signal can be used as a reference phase signal for a wobble signal.

When detecting a wobble address from a groove track in which PID is addressed using a wobble, a phase-modulated push-pull signal is multiplied by a carrier, that is, a wobble clock signal to detect the phase component of an original signal (address data). In other words, when a phase-modulated signal is multiplied by a carrier, an original signal expressed as a direct current (DC) term and a harmonic component with a doubled frequency are generated.

A groove address is recovered from a wobble signal, which is recorded on a groove track as expressed by Equation (3), by multiplying the wobble signal by a carrier, $\sin(\omega t)$, as shown in Equation (4), low pass filtering the multiplied result, and removing a harmonic component from the filtered result to detect an original signal component.

$$a(nT)\sin(\omega t)\cdot\sin(\omega t)+b(nT)\cos(\omega t)\cdot\sin(\omega t)=\tfrac{1}{2}a(nT)-\tfrac{1}{2}a(nT)\cdot\cos(2\omega t)+\tfrac{1}{2}b(nT)\cdot\sin(2\omega t) \quad (4)$$

A land address is recovered from a wobble signal, which is recorded on a groove track as expressed by Equation (3), by multiplying the wobble signal by a carrier, $\cos(\omega t)$, as shown in Equation (5), low pass filtering the multiplied result, and removing a harmonic component from the filtered result to detect an original signal component.

$$a(nT)\sin(\omega t)\cdot\cos(\omega t)+b(nT)\cos(\omega t)\cdot\cos(\omega t)=\tfrac{1}{2}a(nT)\sin(2\omega t)+\tfrac{1}{2}b(nT)+\tfrac{1}{2}b(nT)\cos(2\omega t) \quad (5)$$

Since the shape of a wobble formed on one wall of each track is different from that of a wobble formed on the other wall of each track, and the phase difference between these different wobbles is 90°, a wobble signal read from each track spontaneously becomes a QPSK signal. Therefore, land address information and groove address information can be detected by using an appropriate wobble clock signal ($\sin(\omega t)$ or $\cos(\omega t)$).

In addition, when the period of address information with respect to that of a carrier is synchronized in a simple ratio such as 1:1 or 1:2, a synchronous detection method of simply detecting the phase of a signal can be used. The synchronous detection method extracts the phase of a signal by multiplying a phase-modulated signal by a carrier and then detecting only the size of a signal at a predetermined time interval, instead of low pass filtering the signal. Such a method of detecting a PSK signal is widely known, and thus a detailed description thereof will be omitted.

The PID structure of a wobble signal using the variation in both walls of a groove track according to the present invention will now be more fully described.

It is preferable that address information on a single sector is repeated three times or more. For PID information, the amount of address information to be processed is much smaller than the size of the error correction code (ECC) block of usual user data so that ECC efficiency decreases and the possibility of erroneous correction increases. Accordingly, it is more effective to repeatedly record PID information than to increase the number of bits for error correction. It is typical to use an error detection code (EDC) for error correction of address information.

In the case of recording PID information by loading the PID information on a wobble by way of phase modulation according to the present invention, when a wobble signal is made to have a regular period, the physical length of a sector increases as the size of the sector increases, so that more periods of a wobble signal can be recorded. Accordingly, the size of the PID information increases. On the other hand, when the size of a sector is too large, the minimum recording unit of data also becomes too large, resulting in inefficiency.

It is preferable that the size of a sector is as close to the size of an ECC block as possible. An ECC processing unit is a minimum recording unit. When the size of a sector is set to be smaller than the size of an ECC block, all sectors constituting an ECC block including a sector, in which information will be recorded or modified, should be read, and, after recording/modification of data, ECC information should be updated. As described above, a recording process requires a complex read-modify-write procedure.

For reference, existing 4.7-GB DVD-RAMs are composed of 32-kilobyte (Kbyte) ECC blocks and 2-Kbyte sectors. The length of the recordable field of a sector is 41072 channel bits.

However, it is preferable to increase the size of a sector used in 4.7-GB DVD-RAMs for high density recording. In the case of high density recording, the size of a correctable error decreases compared to the existing 4.7-GB DVD-RAMs when the size of an ECC processing unit is not increased, so it is preferable to increase the size of the ECC processing unit to ensure that the size of a correctable error is the same as that required in the existing 4.7-GB DVD-RAMs. Accordingly, it is preferable to increase the size of a sector to, for example, 4, 8 or 16 Kbytes. When the size of a sector is set to 4 Kbytes, and when existing overhead information is maintained as it is, the number of channel bits per sector is 82144.

When the period of channel data to be recorded is represented by Ts, the period of a wobble signal is represented by Tw, and the period of PID data is represented by Tpid, and the following description concerns the effects resulting from changes in these periods.

The period Ts of channel data determines a recording density on a disc. As the period Tw of a wobble signal increases, the frequency of the wobble signal decreases, and the wobble signal closes to or invades the band of a servo signal such as a tracking error signal. On the other hand, as the period Tw of a wobble signal decreases, the frequency of the wobble signal increases, and the wobble signal closes to or invades a radio frequency (RF) signal band at which user data is recorded. Accordingly, it is essential to appropriately set the band of a wobble signal. In the present invention, the period Tw of a wobble signal is larger than 50Ts and smaller than 450Ts (50Ts<Tw<450Ts). For reference, the period Tw of a wobble signal is set to 186Ts in 4.7-GB DVD-RAMs.

The period Tpid of PID data determines the bandwidth of a modulated signal when the PID data is modulated using a wobble carrier. When the period Tpid of PID data is the same as the period Tw of a wobble signal (Tpid=Tw), and when the frequency of the wobble signal is represented by fw, the bandwidth of the modulated signal is 2fw. When the period Tpid of PID data is double the period Tw of a wobble signal (Tpid=2Tw), and when the frequency of the wobble signal is represented by fw, the bandwidth of the modulated signal is fw. The period Tpid of PID data increases, the bandwidth of a modulated signal decreases, thereby decreasing interference with peripheral signals. However, as the period Tpid increases, the efficiency of a modulated signal decreases, and the amount of recordable PID data decreases. Accordingly, it is preferable that 1.5Tw≦Tpid<8Tw.

Figure 7A:
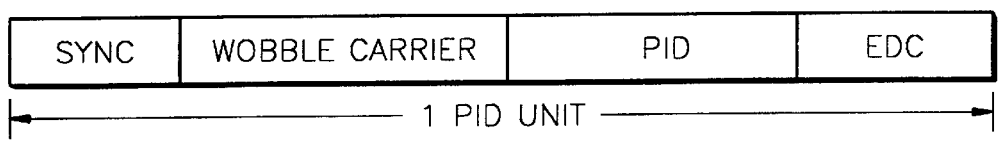
FIGS. 7A through 7C show an example of the contents of the PID addressing structure shown in FIG. 4.
Figure 7B:
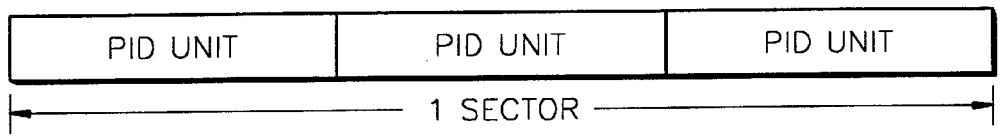
Figure 7C:
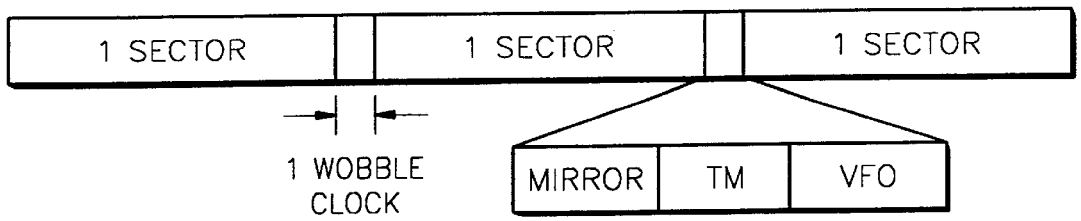

FIGS. 7A through 7C are diagrams showing an example of the contents of a wobble PID according to the PID addressing structure of FIG. 4. As shown in FIG. 7A, a PID unit comprises a wobble sync having synchronization information for determining the start position of a wobble PID signal, a wobble carrier comprising a pure wobble signal not including the PID, a PID which is phase-modulated using a wobble carrier having address information, and an EDC.

Here, the position of the wobble sync and the position of the wobble carrier are interchangeable.

It is preferable that address data (PID) is repeated at least three times in a sector, as shown in FIG. 7B. This is for enhancing the robustness of the address data against erroneous correction or erroneous detection. Accordingly, it is preferable that the same PID unit including an address is repeated three or more times during a single sector period.

As shown in FIG. 7C, a sector mark for indicating the beginning of a physical sector is provided at the beginning of a sector. The sector mark includes a mirror zone (MIRROR), a track mark (TM) having information on a track in which a corresponding sector is currently located, and a VFO signal (VFO) for PLL of data to be recorded in a corresponding sector, for 1 wobble clock period. The mirror zone is on the path of a recording and reproducing beam on a disc, does not have any signal or information, and just reflects an incident beam with a predetermined reflectance. In this mirror zone, refraction due to a pit, record mark or a land/groove structure does not occur, so that an output signal read from the mirror zone is the strongest.

In a wobble PID structure according to the present invention, synchronization information for detecting the beginning of address information (PID) and detecting the phase of a wobble carrier is provided before the address information in order to prevent a temporary failure in achieving a PLL or a temporary asynchronous clock phase from influencing adjacent address information. It is preferable that synchronization information can be detected after data demodulation as well as when the data has been modulated. Accordingly, in the present invention, synchronization information for address information exists in the form of a wobble sync using a Barker-Code which is a sort of a pseudo-random sequence. A method of constructing and detecting a Barker-Code and a synchronizing signal is disclosed in U.S. Pat. No. 5,511,099, entitled "Passband Sync Block Recovery" and issued to the present applicant, and thus a detailed description thereof will be omitted.

In addition, for data modulated by way of QPSK, various methods, such as a method of recording a burst signal having only a carrier of a fixed period and a method of recording a carrier signal in a pilot tone, are proposed to easily detect a carrier. Particularly, in the case of a wobble PID, it is preferable to insert a burst signal having only a wobble carrier signal at a predetermined interval since it is technically difficult to insert a carrier using a pilot tone method. The pilot tone method is proper when it is applied to systems rarely having a change in frequency. However, it is difficult to equally maintain the phase characteristic of a band pass filter for extracting a pilot tone in systems having changes in frequency due to accompanying mechanical devices so that an exact phase cannot be detected.

FIG. 8 is a schematic diagram showing the shapes of a sector mark located at the beginning of a sector and the first sector mark of a track, in the track structure shown in FIG. 6. FIG. 8 shows a first sector mark (a zero sector mark or a reference sector mark), which is located at a transition position from a groove track to a land track or from a land track to a groove track, that is, at the beginning of a track, and a sector mark located at the beginning of a sector. Sector marks are provided to land tracks as well as groove tracks and have different structures in odd tracks and even tracks. The first sector mark of a track has a different structure from the other sector marks of the track.

The sector mark indicates whether a current track to be written to or read from is an even or odd track, and indicates the start point of the corresponding track.

Figure 9A:
Figure 9B:

As shown in FIG. 9A, the sector mark of an even groove track or an even land track includes a mirror zone, a track mark and a VFO signal. As shown in FIG. 9B, unlike the sector mark of an even groove track or an even land track, the sector mark of an odd groove track or an odd land track includes a mirror zone instead of a track mark. That is, the sector mark of an odd groove track or an odd land track sequentially includes a mirror zone, another mirror zone and a VFO signal. The sector mark of an even track shown in FIG. 9A may be the sector mark of an odd track shown in FIG. 9B, and the sector mark of an odd track shown in FIG. 9B may be the sector mark of an even track shown in FIG. 9A. Another modification is also possible.

Figure 9C:
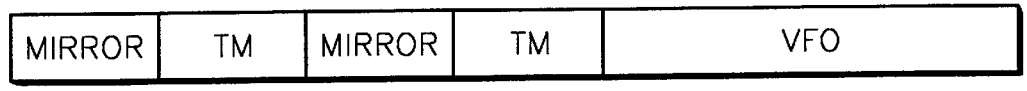

As shown in FIG. 9C, the first sector mark of an even track, which has information on a reference sector indicating the beginning of a track, includes a mirror zone and a track mark in addition to the structure of the sector mark of an even track (FIG. 9A). That is, a mirror zone, track mark, mirror zone, track mark and a VFO signal are sequentially arranged.

Figure 9D:

As shown in FIG. 9D, the first sector mark of an odd track includes a mirror zone and a track mark in addition to the structure of the sector mark of an odd track (FIG. 9B). That is, a mirror zone, track mark, mirror zone, mirror zone and a VFO signal are sequentially arranged. The first sector mark of an even track shown in FIG. 9C can be interchanged with the first sector mark of an odd track shown in FIG. 9D, and another modification is also possible.

FIG. 9E shows a sector mark (SM) and PID structure when each track has m sectors. Sector marks are provided to not only groove tracks but also land tracks, and a PID unit is repeated three times in each groove track.

The following description concerns the generation and detection of a wobble signal using variation in both walls of a groove track according to the present invention.

Figure 10:
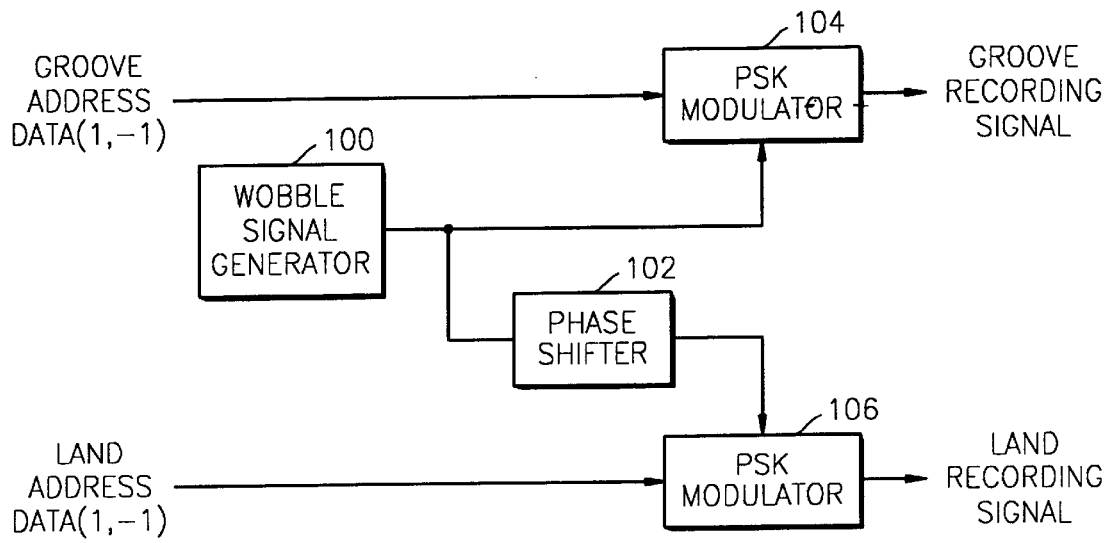
FIG. 10 is a circuit diagram of a wobble address encoding circuit according to an embodiment of the present invention.

FIG. 10 is a circuit diagram of a wobble address encoding circuit according to an embodiment of the present invention. The wobble address encoding circuit includes a wobble signal generator 100, a phase shifter 102, and PSK modulators 104 and 106.

In FIG. 10, the wobble signal generator 100 generates a wobble signal having a predetermined wobble frequency fw. The phase shifter 102 shifts the phase of the wobble signal generated by the wobble signal generator 100 by 90° to generate a phase shifted wobble signal.

The PSK modulator 104, which can be manifested as a multiplier, multiplies groove address data of "1" or "−1" by the wobble signal generated by the wobble signal generator 100. Therefore, a BPSK-modulated signal obtained by multiplying groove address data by a carrier having a phase of 0°, that is, $\sin(\omega t)$, is recorded in one of both walls of a groove track.

The PSK modulator 106, which can be manifested as a multiplier, multiplies groove address data of "1" or "−1" by the phase shifted wobble signal generated by the phase shifter 102. Therefore, a BPSK-modulated signal obtained by multiplying land address data by a carrier having a phase of 90°, that is, $\cos(\omega t)$, is recorded in the other wall of the groove track.

Figure 11:
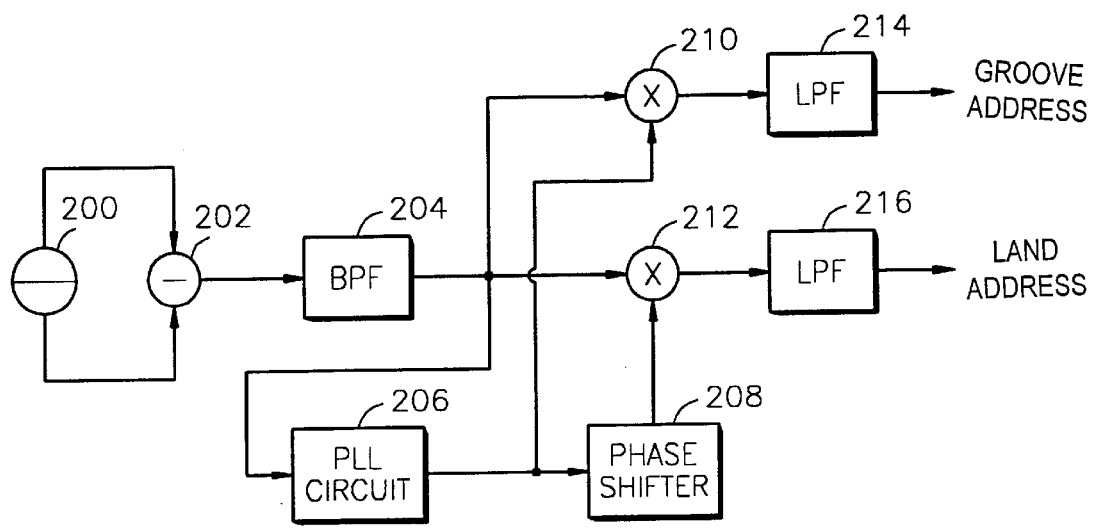
FIG. 11 is a circuit diagram of a wobble address detecting circuit according to an embodiment of the present invention.

FIG. 11 is a circuit diagram of a wobble address detecting circuit according to an embodiment of the present invention. The wobble address detecting circuit includes an optical detecting device 200, a subtractor 202, a band pass filter (BPF) 204, a phase locked loop (PLL) circuit 206, a phase shifter 208, multipliers 210 and 212, and low pass filters (LPFs) 214 and 216.

The subtractor 202 detects a difference signal (a push-pull signal) between the radially half-divided output signals of the optical detecting device 200 which can be manifested as a photodiode. Here, address information is detected from the push-pull signal.

The BPF 204 band filters the push-pull signal. The PLL circuit 206 detects a wobble clock signal from the output of the BPF 204. The phase shifter 208 shifts the phase of the wobble clock signal detected by the PLL circuit 206 by 90° to provide a phase shifted wobble clock signal.

In the case of a BPSK signal or a QPSK signal, a section in which a signal is 0 does not exist during recovery of a wobble clock signal. When the PLL circuit 206 performs full-wave rectification on the push pull signal and obtains a 2-multiple-speed clock signal, a nearly complete clock signal can be detected. The PLL circuit 206 detects the wobble clock signal by recovering and half-dividing a 2-multiple-speed wobble clock signal. However, a phase synchronizing signal is required for the 180°-phase of the 2-multiple-speed clock signal in order to solve an ambiguity problem. Accordingly, the wobble sync and the wobble carrier signal shown in FIG. 7A and the VFO signal recorded in the sector mark shown in FIG. 8 are used.

The multiplier 210 multiplies the band-filtered push-pull signal provided by the BPF 204 by the wobble clock signal provided by the PLL circuit 206. Then, an original signal expressed as a DC term and a multiplied harmonic component are generated. That is, an original signal (groove address data of an in-phase component) and a doubled harmonic component are generated in a groove track, as shown in Equation (4).

The multiplier 212 multiplies the band-filtered push-pull signal provided by the BPF 204 by the 90°-phase shifted wobble clock signal provided by the phase shifter 208. Then, an original signal expressed as a DC term and a multiplied harmonic component are generated. That is, an original signal (land address data of a quadrature component) and a doubled harmonic component are generated in a land track, as shown in Equation (5).

The LPF 214 filters the harmonic component of the output of the multiplier 210 to detect an original signal component (a phase component). The LPF 216 filters the harmonic component of the output of the multiplier 212 to detect an original signal component. In other words, groove address information is provided from the LPF 214 in a groove track, and land address information is provided from the LPF 216 in a land track.

Figure 5:
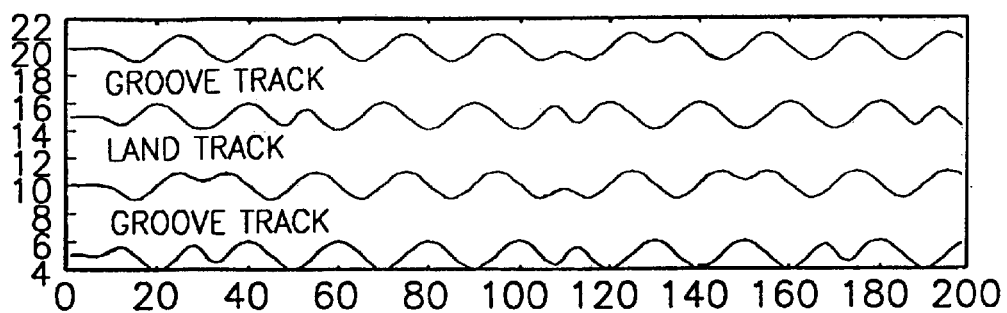
FIG. 5 is a diagram showing waveforms of a wobble signal in land and groove tracks in the structure shown in FIG. 4.
Figure 12A:
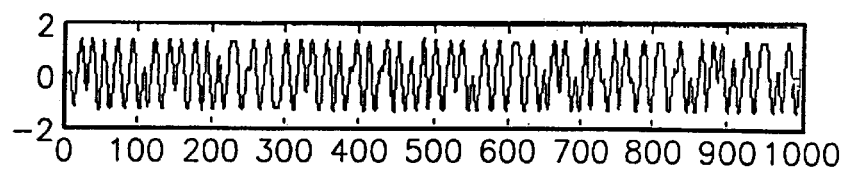

With respect to a generated wobble signal as shown in FIG. 5, in the structure shown in FIG. 4, a signal shown in FIG. 12A, which is read from a groove track, is detected from the push-pull signal of the subtractor 202. A signal shown in FIG. 12B, which is read from a land track, is detected from the push-pull signal of the subtractor 202. A signal shown in FIG. 12C, which is read from a groove track, is detected from the push-pull signal of the subtractor 202.

Figure 12B:
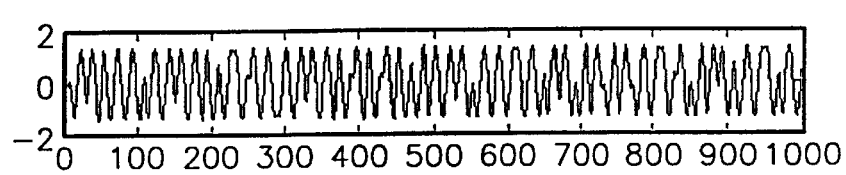
Figure 12C:
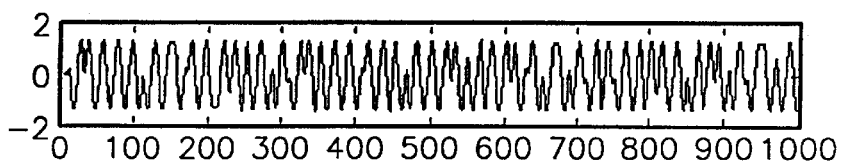
Figure 12D:
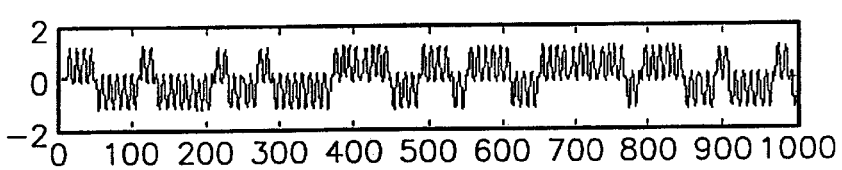
Figure 12E:
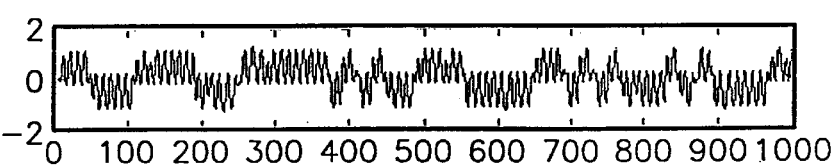

A signal shown in FIG. 12D is output from the multiplier 210 and is the result of multiplying the BPSK-modulated signal of FIG. 12A read from the groove track by $\sin(\omega t)$. A signal shown in FIG. 12E is output from the multiplier 212 and is the result of multiplying the BPSK-modulated signal of FIG. 12A read from the groove track by $\cos(\omega t)$.

Figure 12F:
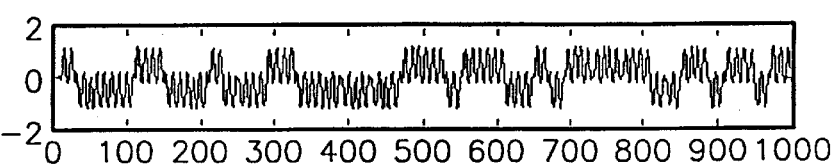

A signal shown in FIG. 12F is output from the multiplier 210 and is the result of multiplying the BPSK-modulated signal of FIG. 12B read from the land track by $\sin(\omega t)$. A signal shown in FIG. 12G is output from the multiplier 212 and is the result of multiplying the BPSK-modulated signal of FIG. 12B read from the land track by $\cos(\omega t)$.

A signal shown in FIG. 12H is output from the multiplier 210 and is the result of multiplying the BPSK-modulated signal of FIG. 12C read from the groove track by $\sin(\omega t)$. A signal shown in FIG. 12I is output from the multiplier 212 and is the result of multiplying the BPSK-modulated signal of FIG. 12C read from the groove track by $\cos(\omega t)$.

FIG. 12J shows groove address information detected from the groove track, which is provided through the low pass filter 214 for removing a harmonic component from the output of the multiplier 210 shown in FIG. 12D. FIG. 12K shows land address information detected from the groove track, which is provided through the low pass filter 216 for removing a harmonic component from the output of the multiplier 212 shown in FIG. 12E.

Figure 12G:
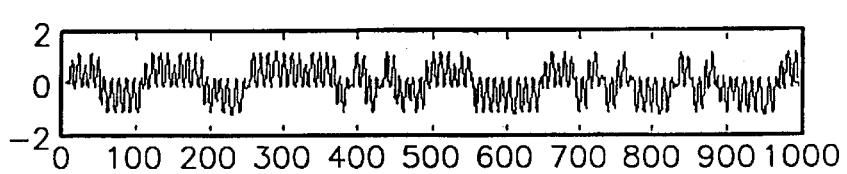

FIG. 12L shows land address information detected from the land track, which is provided through the low pass filter 216 for removing a harmonic component from the output of the multiplier 212 shown in FIG. 12G. FIG. 12M shows groove address information detected from the land track, which is provided through the low pass filter 214 for removing a harmonic component from the output of the multiplier 210 shown in FIG. 12F.

The present invention can be effectively applied to a high density optical recording and reproducing system.

A land track can be discriminated from a groove track according to a PID addressing structure of the present invention. For example, address information indicating a sector number is sequentially allocated in a radial direction starting from the inside of a disc, and recorded in the wall at the boundary between a groove track and a land track, a groove address modulated with a carrier having a phase of 0° is recorded in the inner wall of a groove at the inner most circumference of the disc, and a land address modulated with a carrier having a phase difference of 90° to the above carrier is recorded in a wall at the boundary between the innermost groove and the next land. In this case, the address (sector number) of a land track has a larger value in a groove track, and the address (sector number) of a groove track has a larger value in a land track. In addition, a land address is extracted from a quadrature signal component, and a groove address is generated from an in-phase signal component so that it can be determined whether a land track or a groove track is read at present using the above relation.

In the present invention, not only is one address information recorded in a single area, for example, the address of a sector is recorded in an area corresponding to the single sector in a groove track, but also the address of a corresponding sector in an adjacent land track can be recorded in the sector area. The address of a corresponding sector in an adjacent land track may vary with the length of the sector and the characteristics of a modulated signal. Through such a method, a plurality of addresses can be read while a single sector is being read so that, even if one of groove address information and land address information cannot be read, the address information that cannot be read can be inferred from the address information that is read and other disc information.

As described above, the present invention can solve the overhead problem of a conventional PID addressing method using embossed pre-pits, and can solve the problem that a conventional wobble address method cannot be applied to a land and groove recording method.

In addition, the present invention records in each track, wobble address information phase modulated using wobble signals having a predetermined phase relation, that is, having a phase difference of 90° between adjacent tracks, so that a QPSK signal can be read from each track. Therefore, a larger amount of data can be recorded, and a short period of a wobble signal does not cause a problem. Since a section in which a wobble signal disappears does not exist, the present invention is advantageous in recovering a wobble clock signal.

What is claimed is:

1. A method of addressing physical identification information using wobbles on an optical recording medium, comprising:

phase modulating first address information indicating the physical identification information using a first wobble signal;

recording the phase modulated first address information in one of two walls of one of a groove track and a land track;

phase modulating second address information using a second wobble signal having a specified phase relation with the first wobble signal, the first and second wobble signals having different phases; and recording the phase modulated second address information in the other wall of the two walls, wherein configurations of the two walls differ as a result of the specified phase relation.

2. The method of claim 1, wherein the phase relation between the first and second wobble signals is a phase difference of 90 degrees so that a signal readable from each track of the optical recording medium is a quadrature phase shift keying (QPSK) signal.

3. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal; and recording the phase modulated second address information in the other wall, wherein the first address information is a groove address recorded in the one of the two walls of the groove track as an in-phase component signal of a quadrature phase shift keying (QPSK) signal, and the second address information is a land address recorded in the other wall of the groove track as a quadrature component signal of the QPSK signal.

4. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal; and recording the phase modulated second address information in the other wall, wherein the first address information is a land address recorded in the one of the two walls of the groove track as an in-phase component signal of a quadrature phase shift keying (QPSK) signal, and the second address information is a groove address recorded in the other wall of the groove track as a quadrature component signal of the QPSK signal.

5. The method of claim 1, wherein the first and second address information each comprises address information of a current track of the optical recording medium, and address information of an adjacent track.

6. The method of claim 1, further comprising recording information in predetermined units for synchronizing an initial phase of the first and second wobble signals in each track.

7. The method of claim 1, wherein the one groove or land track comprises minimum recording units, and the method further comprises repeatedly recording each of the first and second address information three or more times in each of the minimum recording units.

8. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal; and recording the phase modulated second address information in the other wall, wherein the first and second address information each comprises a wobble sync having synchronization information for determining a beginning of physical identification data (PID), a wobble carrier comprising a pure wobble signal without the PID, the PID being phase modulated with a wobble carrier having address information, and an error detection code.

9. The method of claim 8, wherein a period of the PID is larger than 1.5 times a period of the wobble carrier and smaller than 8 times the period of the wobble carrier.

10. The method of claim 8, wherein a period of the wobble carrier is larger than 50 times a period of channel data and smaller than 450 times the period of the channel data, the channel data being recorded on the optical recording medium.

11. The method of claim 8, wherein the wobble sync is detectable in a modulated state and/or after demodulation.

12. The method of claim 8, wherein the wobble sync comprises a pseudo-random sequence.

13. The method of claim 12, wherein the wobble sync comprises a Barker-Code.

14. The method of claim 1, wherein each of the groove track and the land track comprises minimum recording units, the method further comprising recording a sector mark at a beginning of each minimum recording unit in each track.

15. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal;

recording the phase modulated second address information in the other wall; and recording a sector mark at a beginning of each minimum recording unit in each track, wherein each of the groove track and the land track comprises minimum recording units, and wherein the optical recording medium comprises odd groove and land tracks and even groove and land tracks, wherein the structure of the sector mark is different in the even groove and land tracks as opposed to the odd groove and land tracks, and the structure of a first sector mark of each track is different from the structure of any of the other sector marks in the same track.

16. The method of claim 15, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

17. The method of claim 15, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

18. A circuit for encoding an address using a wobble in an optical recording and reproducing system, comprising:

a provider which generates a first wobble signal and a second wobble signal which has a specified phase relation with the first wobble signal, the first and second wobble signals having different phases; and a phase modulator which phase modulates first address information indicating physical identification information using the first wobble signal with respect to one of two walls of one of of a groove track and a land track of a recording medium, and phase modulates second address information using the second wobble signal with respect to the other wall of the two walls, wherein configurations of the two walls differ as a result of the specified phase relation.

19. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the phase relation is a phase difference between the first and second wobble signals of both walls of the groove track of 90 degrees so that the first and second address information are bi-phase shift keying (BPSK)-modulated with respect to the two walls of the groove track, and a signal readable from the groove track and the land track is a quadrature phase shift keying (QPSK) signal.

20. The circuit of claim 18, wherein the provider comprises:

a wobble signal generator which generates the first wobble signal of a predetermined frequency; and a phase shifter which shifts the phase of the first wobble signal by 90° to generate the second wobble signal.

21. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the phase modulator comprises:

a first multiplier which multiplies groove address data by the first wobble signal to provide the wobble signal in which a groove address corresponding to the first address information is modulated in an in-phase component of a quadrature phase shift keying (QPSK) signal; and a second multiplier which multiplies land address data by the second wobble signal to provide the wobble signal in which a land address corresponding to the second address information is modulated in a quadrature component of the QPSK signal.

22. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the phase modulator comprises:

a first multiplier which multiplies land address data by the first wobble signal to provide the wobble signal in which a land address corresponding to the first address information is modulated in an in-phase component of a quadrature phase shift keying (QPSK) signal; and a second multiplier which multiplies groove address data by the second wobble signal to provide the wobble signal in which a groove address corresponding to the second address information is modulated in a quadrature component of the QPSK signal.

23. The circuit of claim 18, wherein the first and second address information each includes address information of a current track of the optical recording medium, and address information of an adjacent track.

24. The circuit of claim 18, wherein the groove or land track comprises minimum recording units, and the first and second address information each is repeatedly recorded three or more times in each of the minimum recording units.

25. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the first and second address information each comprises a wobble sync having synchronization information for determining a beginning of physical identification data (PID), a wobble carrier comprising a pure wobble signal without the PID, the PID being phase modulated with a wobble carrier having address information, and an error detection code.

26. The circuit of claim 25, wherein a period of the PID is larger than 1.5 times a period of the wobble carrier and smaller than 8 times the period of the wobble carrier.

27. The circuit of claim 25, wherein a period of the wobble carrier is larger than 50 times a period of channel data and smaller than 450 times the period of the channel data, the channel data being recorded on an optical recording medium.

28. The circuit of claim 25, wherein the wobble sync is detectable in a modulated state and/or after demodulation.

29. The circuit of claim 25, wherein the wobble sync comprises a pseudo-random sequence.

30. The circuit of claim 29, wherein the wobble sync comprises a Barker-Code.

31. The circuit of claim 18, wherein a sector mark is recorded at a beginning of a minimum recording unit in each track during recording medium mastering.

32. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein a sector mark is recorded at a beginning of a minimum recording unit in each track during recording medium mastering, and wherein the optical recording medium comprises odd groove and land tracks and even groove and land tracks, wherein the structure of the sector marks is different in the even groove and land tracks as opposed to the odd groove and land tracks, and the structure of a first sector mark of each track is different from the structure of any of the other sector marks in the same track.

33. The circuit of claim 32, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

34. The circuit of claim 32, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

35. A recording and reproducing medium employing a groove/land recording comprising:

land and groove tracks;

first address information indicating physical identification information which is phase modulated using a first wobble signal and recorded in one of two walls of one of the groove tracks and the land tracks; and second address information which is phase modulated using a second wobble signal having a specified phase relation with the first wobble signal and recorded in the other wall of the two walls, the first and second wobble signals having different phases, wherein configurations of the two walls differ as a result of the specified phase relation.

36. A recording and reproducing medium employing a groove/land recording comprising:

land and groove tracks;

first address information indicating physical identification information which is phase modulated using a first wobble signal and recorded in one of two walls of one of the groove tracks or one of the land tracks; and second address information which is phase modulated using a second wobble signal having a predetermined phase relation with the first wobble signal and recorded in the other wall of the one groove or land track, wherein the phase relation between the wobble signals is a phase difference between the wobble signals of both walls of each groove track of 90 degrees so that the first and second address information are bi-phase shift keying (BPSK)-modulated in both walls of each groove track, and a signal readable from each track of the recording medium is a quadrature phase shift keying (QPSK) signal.

37. The recording medium of claim 35, wherein the first and second address information each comprises the address information of a current track of the optical recording medium, and the address information of an adjacent track.

38. A recording and reproducing medium employing a groove/land recording comprising:

land and groove tracks;

first address information indicating physical identification information which is phase modulated using a first wobble signal and recorded in one of two walls of one of the groove tracks or one of the land tracks; and second address information which is phase modulated using a second wobble signal having a predetermined phase relation with the first wobble signal and recorded in the other wall of the one groove or land track, wherein one of the land tracks is discriminated from one of the groove tracks based upon a correlation between a size of address data on the one land track and a size of address data on the one groove track.

39. The recording medium of claim 35, further comprising an area including information in predetermined units for synchronizing an initial phase of the first and second wobble signals in each groove track.

40. A recording and reproducing medium employing a groove/land recording comprising:

land and groove tracks;

first address information indicating physical identification information which is phase modulated using a first wobble signal and recorded in one of two walls of one of the groove tracks or one of the land tracks;

second address information which is phase modulated using a second wobble signal having a predetermined phase relation with the first wobble signal; recorded in the other wall of the one groove or land track; and an area including information in predetermined units for synchronizing an initial phase of the first and second wobble signals in each groove track, wherein the area is a mirror zone.

41. The recording medium of claim 35, wherein the land and groove tracks each comprise minimum recording units, and the first and second address information are repeatedly recorded three or more times in each if the minimum recording units.

42. A recording and reproducing medium employing a groove/land recording comprising:

land and groove tracks;

first address information indicating physical identification information which is phase modulated using a first wobble signal and recorded in one of two walls of one of the groove tracks or one of the land tracks; and second address information which is phase modulated using a second wobble signal having a predetermined phase relation with the first wobble signal and recorded in the other wall of the one groove or land track, wherein the first and second address information each comprises a wobble sync having synchronization information for determining a beginning of physical identification data (PID), a wobble carrier comprising a pure wobble signal without the PID, the PID which is phase modulated with a wobble carrier having address information, and an error detection code.

43. The recording medium of claim 42, wherein a period of the PID is larger than 1.5 times a period of the wobble carrier and smaller than 8 times a period of the wobble carrier.

44. The recording medium of claim 42, wherein the period of the wobble carrier is larger than 50 times a period of channel data and smaller than 450 tunes the period of the channel data, the channel data being recorded on the optical recording medium.

45. The recording medium of claim 42, wherein the wobble sync is detectable in a modulated state and/or after demodulation.

46. The recording medium of claim 42, wherein the wobble sync comprises a pseudo-random sequence.

47. The recording medium of claim 46, wherein the wobble sync comprises a Barker-Code.

48. The recording medium of claim 35, wherein each of the groove and land tracks comprise minimum recording units and a sector mark is provided at a beginning of each minimum recording unit in each track.

49. A recording and reproducing medium employing a groove/land recording comprising:

land and groove tracks;

first address information indicating physical identification information which is phase modulated using a first wobble signal and recorded in one of two walls of one of the groove tracks or one of the land tracks; and second address information which is phase modulated using a second wobble signal having a predetermined phase relation with the first wobble signal and recorded in the other wall of the one groove or land track, wherein each of the groove and land tracks comprise minimum recording units and a sector mark is provided at a beginning of each minimum recording unit in each track, and wherein the groove tracks form odd and even groove tracks, the land tracks form odd and even land tracks, the structure of the sector marks is different in the even groove and land tracks as opposed to the odd groove and land tracks, and the structure of a first sector mark of each track is different from the structure of any of the other sector marks in the same track.

50. The recording medium of claim 49, wherein the sector mark of each of the even groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

51. The recording medium of claim 49, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

52. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the provider comprises:

a wobble signal generator which generates the first wobble signal of a predetermined frequency; and a phase shifter which shifts the phase of the first wobble signal by 90° to generate the second wobble signal, and wherein the phase modulator comprises:

a first multiplier which multiplies groove address data by the first wobble signal to provide the wobble signal in which a groove address corresponding to the first address information is modulated in an in phase component of a quadrature phase shift keying (QPSK) signal; and a second multiplier which multiplies land address data by the second wobble signal to provide the wobble signal in which a land address corresponding to the second address information is modulated in a quadrature component of the QPSK signal.

53. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the provider comprises:

a wobble signal generator which generates the first wobble signal of a predetermined frequency; and a phase shifter which shifts the phase of the first wobble signal by 90° to generate the second wobble signal, and wherein the phase modulator comprises:

a first multiplier which multiplies land address data by the first wobble signal to provide the wobble signal in which a land address corresponding to the first address information is modulated in an in-phase component of a quadrature phase shift keying (QPSK) signal; and a second multiplier which multiplies groove address data by the second wobble signal to provide the wobble signal in which a groove address corresponding to the second address information is modulated in a quadrature component of the QPSK signal.

54. The circuit of claim 21, wherein the first wobble signal is sin(wt) and the second wobble signal is cos(wt).

55. The circuit of claim 22, wherein the first wobble signal is sin(wt) and the second wobble signal is cos(wt).

56. The circuit of claim 32, wherein the sector mark of each of the odd groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

57. The circuit of claim 32, wherein the first sector mark of each of the even groove and land tracks comprises a mirror,zone, a track mark, another mirror zone, another track mark and a VFO signal, and the first sector mark of each of the odd groove and land tracks comprises the mirror zone, the track mark, another mirror zone, still another mirror zone and the VFO signal.

58. The circuit of claim 49, wherein the sector mark of each of the odd groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

59. The circuit of claim 50, wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

60. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal;

recording the phase modulated second address information in the other wall; and recording a sector mark at a beginning of each minimum recording unit in each track, wherein each of the groove track and the land track comprises minimum recording units, and wherein the sector mark of each of the odd groove and land tracks comprises a mirror zone, a track mark having information for discriminating an even track from an odd track, and a variable frequency oscillator (VFO) signal having phase synchronization information, and the sector mark of each of the odd groove and land tracks comprises the mirror zone, another mirror zone and the VFO signal.

61. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal;

recording the phase modulated second address information in the other wall; and recording a sector mark at a beginning of each minimum recording unit in each track, wherein each of the groove track and the land track comprises minimum recording units, and wherein the first sector mark of each of the even groove and land tracks comprises a mirror zone, a track mark, another mirror zone, another track mark and a VFO signal, and the first sector mark of each of the odd groove and land tracks comprises the mirror zone, the track mark, another mirror zone, still another mirror zone and the VFO signal.

62. A method of addressing physical identification data on a recording medium having groove land tracks, the method comprising:

storing an in-phase component signal of a quadrature shift keying (CPSK) signal in one of two walls of one of the groove tracks or one of the land tracks; and storing a quadrature component signal of the QPSK signal in the other one of the two walls;

wherein the in-phase component signal represents one of groove and land address information and the quadrature component signal represents the other one of the groove and land address information.

63. The method of claim 62, further comprising:

generating the in-phase component signal to be bi-phase shift keying (BPSK) modulated; and phase shifting the in-phase component signal by 90 degrees to generate the quadrature component signal which is bi-phase shift keying (BPSK)-modulated.

64. A recording medium which stores physical identification data, comprising:

land and groove tracks; and wherein one of the land and groove tracks has two walls, one of the two walls stores an in-phase component signal of a quadrature shift keying (QPSK) signal, and the other one of the two walls stores a quadrature component signal of the QPSK signal;

wherein the in-phase component signal represents one of groove and land address information and the quadrature component signal represents the other one of the groove and land address information.

65. The recording medium of claim 64, where the in-phase component signal is bi-phase shift keying (BPSK)-modulated, and the quadrature component signal is phase shifted from the in-phase component signal by 90 degrees and is bi-phase shift keying (BPSK) modulated.

66. A method of addressing physical identification data on a recording medium having grooves and tracks, the method comprising:

storing a first wobble in one of two walls of one of the grooves and the lands; and storing a second wobble phase shifted from the first wobble in the other one of the two walls, wherein configurations of the two walls differ as a result of the phase shift, and wherein the first and second wobbles together form a quadrature shift keying (QPSK) signal.

67. The method of claim 66, wherein the first wobble represents one of groove and land address information and the second wobble represents the other one of the groove and land address information.

68. A recording medium which stores physical identification data, comprising:

land and groove tracks;

wherein one of the land and groove tracks has two walls, wherein one of the two walls stores a first wobble, and the other one of the two walls stores a second wobble phase shifted from the first wobble, wherein configurations of the two walls differ as a result of the phase shift, and wherein the first and second wobbles together form a quadrature shift keying (QPSK) signal.

69. The recording medium of claim 68, wherein the first wobble represents one of groove and land address information and the second wobble represents the other one of the groove and land address information.

70. The method of claim 1, wherein the land or groove track is divided into error correction blocks each comprising a plurality of sectors, wherein a size of each sector is 4, 8 or 16 Kbytes and a size of the error correction block is 32 Kbytes.

71. The method of claim 1, wherein the recording of the phase modulated first and second address signals in the two walls comprises using burst signals to record the phase modulated first and second address signals in the two walls.

72. A method of addressing physical identification information using wobbles on an optical recording medium, comprising:

phase modulating first address information indicating the physical identification information using a first wobble signal;

recording the phase modulated first address information in one of two walls of either of a groove track and a land track, and phase modulating second address information using a second wobble signal having a predetermined phase relation with the first wobble signal; and recording the phase modulated second address information in the other wall, wherein the recording of the phase modulated first and second address signals in the two walls comprises using pilot tone signals to record the phase modulated first and second address signals in the two walls.

73. A method of addressing physical identification information using wobbles on an optical recording medium, comprising:

phase modulating first address information indicating the physical identification information using a first wobble signal;

recording the phase modulated first address information in one of two walls of either of a groove track and a land track;

phase modulating second address information using a second wobble signal having a predetermined phase relation with the first wobble signal; and recording the phase modulated second address information in the other wall, wherein the first and second address information each comprises address information of a current track of the optical recording medium, and address information of an adjacent track, and wherein the first and second address information each comprise a sector number of the current track and the adjacent track, wherein the sector number of the land track has a larger value than the groove track if the current track is the groove track and a smaller value if the current track is the land track.

74. A circuit for encoding an address using a wobble in an optical recording and reproducing system, comprising:

a provider which generates a first wobble signal and a second wobble signal which has a predetermined phase relation with the first wobble signal; and a phase modulator which phase modulates first address information indicating physical identification information using the first wobble signal with respect to one of two walls of either of a groove track and a land track of a recording medium, and phase modulates second address information using the second wobble signal with respect to the other wall, wherein the first and second address information each includes address information of a current track of the optical recording medium, and address information of an adjacent track, and wherein the first and second address information each comprise a sector number of the current track and the adjacent track, wherein the sector number of the land track has a larger value than the groove track if the current track is the groove track and a smaller value if the current track is the land track.

75. A recording and reproducing medium employing a groove/land recording comprising:

land and groove tracks;

first address information indicating physical identification information which is phase modulated using a first wobble signal and recorded in one of two walls of one of the groove tracks or one of the land tracks; and second address information which is phase modulated using a second wobble signal having a predetermined phase relation with the first wobble signal and recorded in the other wall of the one groove or land track, wherein the first and second address information each comprises the address information of a current track of the optical recording medium, and the address information of an adjacent track, and wherein the first and second address information each comprise a sector number of the current track and the adjacent track, wherein the sector number of the land track has a larger value than the groove track if the current track is the groove track and a smaller value if the current track is the land track.

* * * * *

UNITED STATES PATENT AND TRADEMARK OFFICE
CERTIFICATE OF CORRECTION

PATENT NO.   : 6,813,230 B1
DATED        : November 2, 2004
INVENTOR(S)  : Jung-wan Ko et al.

It is certified that error appears in the above-identified patent and that said Letters Patent is hereby corrected as shown below:

Column 21,
Line 42, change "50" to -- 49 --.

Signed and Sealed this

Twenty-sixth Day of April, 2005

JON W. DUDAS
*Director of the United States Patent and Trademark Office*